Dec. 22, 1959   F. D. PFENING   2,918,330
METHOD AND APPARATUS FOR HANDLING FLOUR
Filed March 16, 1959   5 Sheets-Sheet 1

INVENTOR
FREDERIC D. PFENING

BY Schmieding and Fultz
ATTORNEYS

Dec. 22, 1959 F. D. PFENING 2,918,330
METHOD AND APPARATUS FOR HANDLING FLOUR
Filed March 16, 1959 5 Sheets-Sheet 4

INVENTOR
FREDERIC D. PFENING
BY Schmieding and Fultz
ATTORNEYS

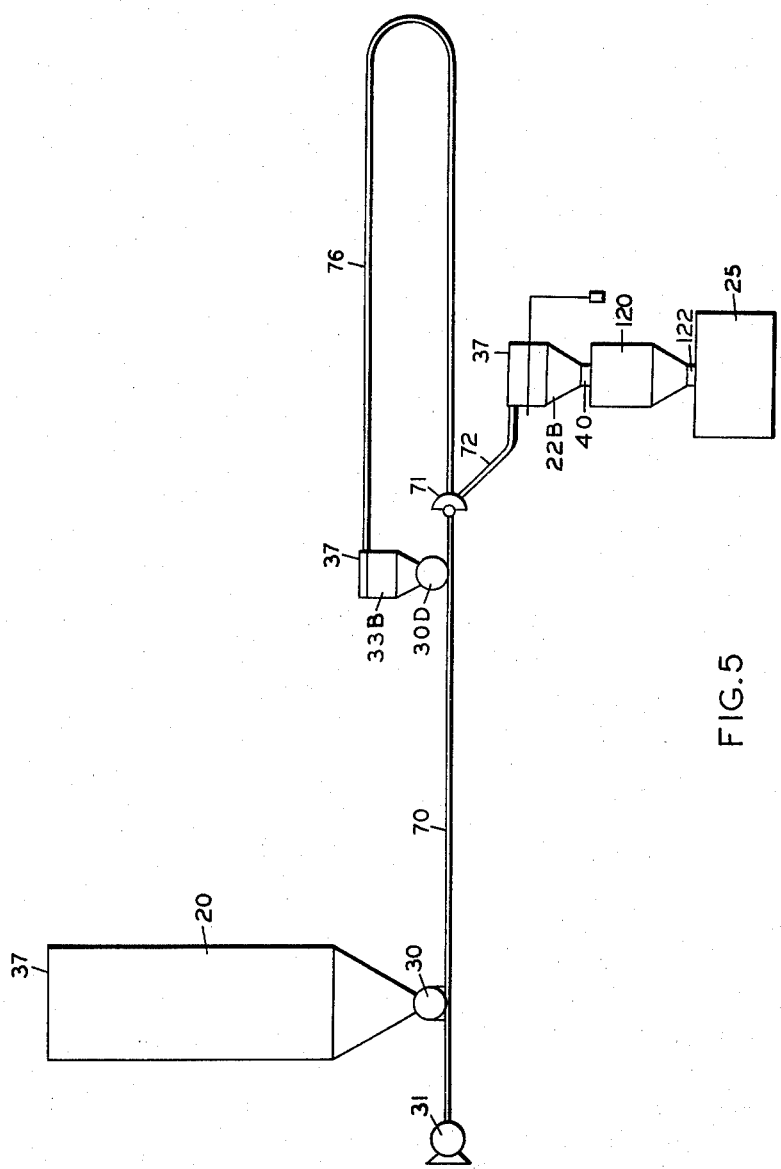

United States Patent Office 2,918,330
Patented Dec. 22, 1959

2,918,330

METHOD AND APPARATUS FOR HANDLING FLOUR

Frederic D. Pfening, Columbus, Ohio

Application March 16, 1959, Serial No. 799,554

11 Claims. (Cl. 302—28)

This invention relates to novel method and apparatus for the automatic handling of finely divided particles such as flour or other ingredients used in large scale bakery operations.

This application is a continuation-in-part of my copending application Serial No. 653,339 filed April 17, 1957, now Patent No. 2,903,301, granted Sept. 8, 1959.

In general the present invention is applicable to pneumatic conveying systems for flour of the type wherein flour is transported from one or more storage means to any one of a plurality of scale hoppers where charges of flour are weighed and thence delivered to any one of a plurality of mixers. In systems of this type the flour is transferred from a storage means to a scale hopper via a conduit of flowing air to which the particles of flour are delivered by means of a suitable feeder such that the particles of flour are entrained in the flowing air and hence moved through the conduit to the scale hopper. After the desired weight of flour has been delivered to a scale hopper the flow must be terminated at the intake to the scale hopper. Moreover, it is necessary to terminate the delivery of particles to the flowing air at the feeder while continuing the flow of air through the conduit leading from the feeder to the scale hopper until such conduit has been freed of the line charge of flour entrained in the flow in the conduit at the time the flow is terminated at the intake of the scale hopper. It is necessary to remove such line charge from the conduit prior to terminating the flow of air since if the flowing flour is allowed to become static in the conduit the conduit will become clogged with flour next time the flow of air commences.

According to the present invention the systems thereof are provided with novel means for delivering precisely weighed charges of flour to one or more scale hoppers and for clearing the line charges from the delivery conduit. Such novel means comprises one or more residue hoppers having an outlet or outlets upstream of the intake or intakes to one or more scale hopper. In addition, the inlet or inlets to said one or more residue hoppers are located downstream of said inlet or inlets to said one or more scale hoppers. In operation, a flow of flour and air is conveyed from a storage bin through a conduit that passes the closed outlet of a residue hopper, through a diverter valve, and then into the intake of a scale hopper until the desired weight has ben delivered to said scale hopper. The delivery of flour from the storage bin is next terminated, while continuing the flow of air, and said diverter valve is shifted to terminate delivery of flour and air to the scale hopper and to connect said conduit with the intake to said residue hopper whereby the line charge of flour is cleared from said conduit and deposited in said residue hopper. Upon commencing the next scaling cycle the outlet from the residue hopper is opened to deliver the previously collected line charge of flour to the conduit leading to the scale hopper. By incorporating such novel residue hopper arrangements in the systems of the present invention the use of a closed loop return circuit to the flour storage bins is avoided whereby the total length of conduit required is greatly reduced.

As another aspect of the present invention two or more of the above mentioned residue hoppers are arranged for use with the same scale hopper for weighing into a single combination batch.

As still another aspect the two or more residue hoppers are arranged for use with each of a plurality of scale hoppers for weighing combination batches for each of them.

By such multiple arrangements of residue hoppers and scale hoppers the systems can be utilized to effect blending of two or more varieties of flour, or flour, sugar and other ingredients with accuracy and dispatch. For example, it is sometimes desirable to blend Kansas Winter wheat flour with Minnesota Spring wheat flour, or patent white flour with other grades. By prior practices such blending has been done by dumping together the required number of bags of each ingredient, or by a plurality of screw conveyors feeding into a common collector with the revolutions per minute of the variable speed drives being set at certain speeds to roughly proportion the ingredients. The output of ingredients via plurality of screw conveyors is not uniform and therefore blending of ingredients is inaccurately proportioned. The density of flowable particles varies in acordance with head load, moisture, and retained air. For instance white flour may vary in weight per cubic foot from 30 pounds when thoroughly aerated to 60 pounds after lying in a storage bin for various periods of time. With the systems of the present invention, however, a plurality of residue hoppers, feeding into a common scale hopper, or into each of a plurality of scale hoppers, provide novel apparatus whereby a plurality of ingredients can be rapidly blended in precise proportions, regardless of previous density, by successively delivering batches of different flours or other ingredients.

Another aspect is that the sponge method of dough mixing and fermenting is accomplished by use of a portion of the whole predetermined amount of flour in the sponge, which is then fermented for a period of hours and returned to the mixer, and the remaining portion of the total predetermined amount is then added and mixing thereof continued for a predetermined number of minutes. It is preferred by some bakeries that the sponge flour and the portion added be of a different type and neither of these should contaminate the other. This may be Montana grown spring wheat flour for the sponge stage and Kansas winter wheat for the second added portion. In other instances the formulae may consist of a clear grade of white flour and rye flour; white flour and a coarsely ground whole wheat, rye, or other types. This invention permits a selective means which avoids contamination or unwanted mixing of any two or more ingredients being returned to original container.

It is therefore an object of the present invention to provide improved pnueumatic conveying systems for flour or the like which systems are adapted to deliver accurately weighed charges of flour to one or more scale hoppers and clear the delivery conduits of line charges without contamination by means of a novel flour delivery circuit comprising a residue hopper for receiving said line charges.

It is another object of the present invention to provide a flour handling system of the type described that is adapted to selectively deliver various types of flour to any one of a plurality of mixers.

It is still another object of the present invention to provide novel flour handling systems of the type described that are adapted to rapidly blend a plurality of flour types, or other ingredients, in precisely proportioned relationship.

Further objects and advantages of the present invention will be apparent from the following description, reference being had to the accompanying drawings wherein preferred forms of embodiments of the invention are clearly shown.

In the drawings:

Fig. 5 is a diagrammatic view of a fifth flour handling system constructed according to the present invention and comprising another aspect thereof.

Figure 1:
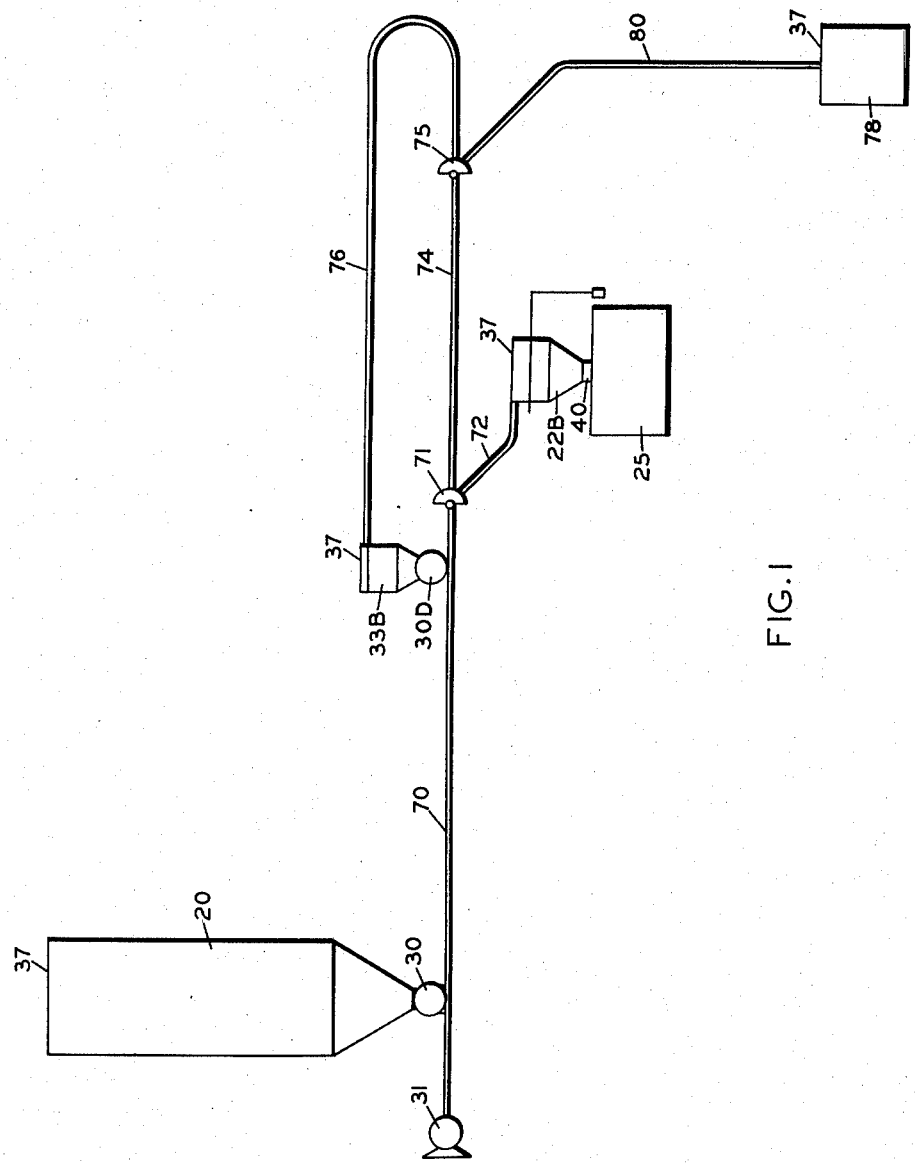
Fig. 1 is a diagrammatic view of a flour handling system constructed according to the present invention and comprising another aspect thereof.

Referring in detail to the drawing, Figure 1 illustrates a flour handling system constructed according to the present invention.

Storage bin 20 for containing a supply of flour to be delivered to a scale hopper indicated generally at 22–B delivers flour through rotary feeder 30 to conduit 70, the flour being carried along in a flow of air from blower 31. The flow of air and flour in conduit 70 passes through a two-way diverter valve 71 and a conduit 72 into a scale hopper 22–B. While flour is being delivered to scale hopper 22–B a valve 40 leading to a mixer 25 is maintained in a normally closed position.

Rotary feeder 30 serves the function of adding the particles of flour to the flow of air in a controlled manner whereby the particles become suspended in the flowing air and behave like a fluid. By this method the flour is efficiently transported to a scale hopper. In general the construction of rotary feeder 30 comprises a cylindrical compartment containing a shaft carrying radially extending blades, not illustrated. The shaft and blades are rotated to successively align compartments of flour with the air flow from a blower 31.

After a predetermined weight of flour is delivered to scale hopper 22–B diverter valve 71 is actuated to connect conduit 70 with conduit 74, diverter valve 75, and conduit 76, leading to residue hopper 33–B. After diverter valve 71 is shifted to connect conduit 70 with conduit 74 rotary feeder 30 is stopped and blower 31 continues to operate for a time sufficient to clear conduit 70 of the line charge of flour, said line charge being delivered to residue hopper 33–B.

Diverter valve 71 is preferably provided with control means for automatically shifting the connection of conduit 70 from conduit 72 to conduit 74 responsive to a predetermined weight of flour to scale hopper 22–B.

After a predetermined weight of flour has been weighed and collected in scale hopper 22–B normally closed valve 40 is opened whereby the charge of flour is delivered by gravity to mixer 25.

It should be pointed out that the top of scale hopper 22–B and residue hopper 33–B are provided with air vent means which may be in the form of filters 37. Alternative air vent means, not illustrated, may be provided by conduits leading from said hoppers to a common type of a dust collector. Such air vent means serve to permit the escape of air while the flour is maintained within the hopper.

With continued reference to Figure 1 when the next cycle of operation is started rotary feeder 30–D is operated for a few seconds, until partially or completely empty, along with rotary feeder 30 which is operated for a time sufficient to supply the required weight of flour at scale hopper 22–B. This serves to clear residue hopper 33–B sufficiently to receive the next line charge which is present in conduit 70 when diverter valve 71 is switched to make connection with conduit 74.

As seen in Figure 1 the system includes a dusting flour container 78 which can be filled from conduits 70 and 74 when diverter valve 75 is shifted to connect conduit 74 with conduit 80 leading to the dusting flour container 78.

Figure 2:
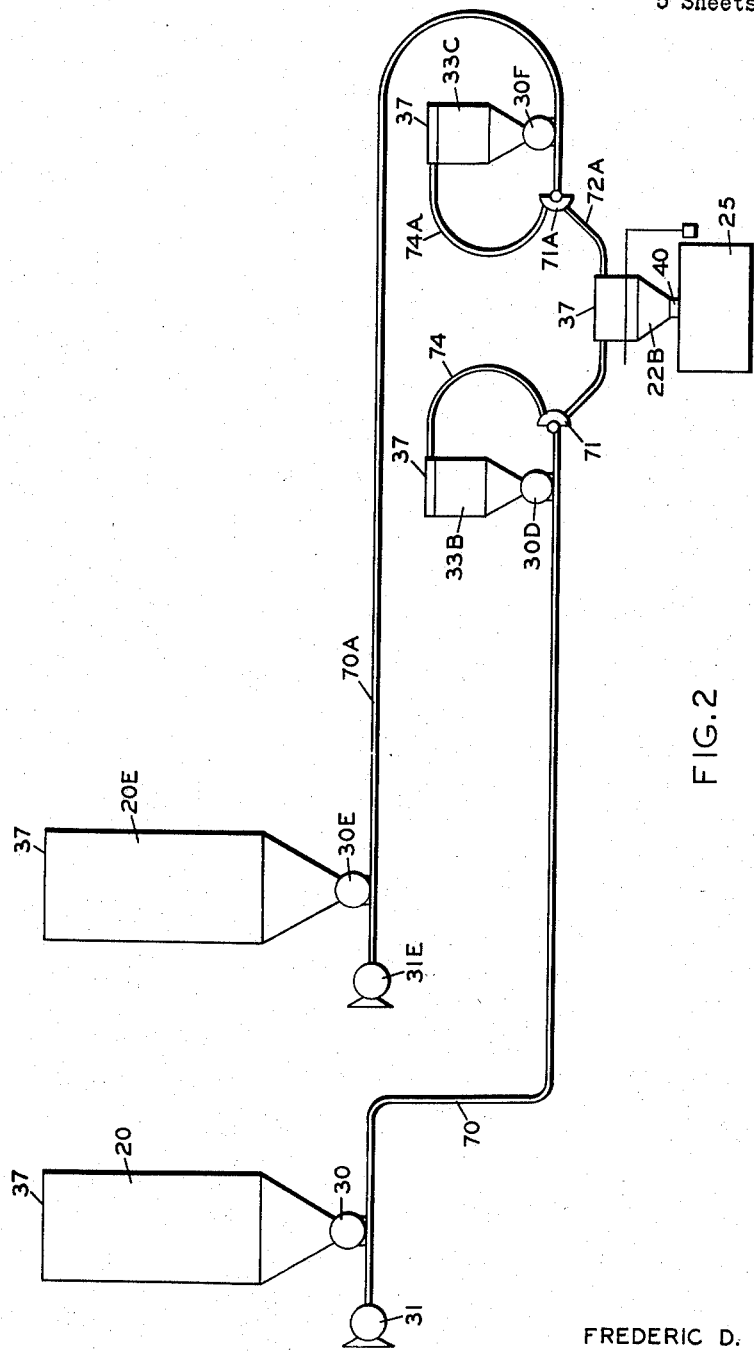
Fig. 2 is a diagrammatic view of a second flour handling system constructed according to the present invention and comprising another aspect thereof.

Reference is next made to Figure 2 which illustrates a modification of the system of Figure 1 that is adapted for handling two different flour types each of which can be selectively delivered to a single scale hopper 22–B and thence to a mixer 25.

The components of Figure 2 which are identical to the components of Figure 1 are designated by identical numerals.

The system of Figure 2 differs from that of Figure 1 in that it includes a second storage bin 20–E that delivers a second flour type through conduits 70–A and 72–A to scale hopper 22–B. When a predetermined weight of flour from storage bin 20–E is delivered to scale hopper 22–B diverter valve 71–A is automatically actuated to disconnect conduit 70–A from conduit 72–A and connect the former with conduit 74–A leading to residue hopper 33–C. Rotary feeder 30–E is at the same time stopped and the operation of blower 31 is continued for a period of time sufficient to clear conduit 72–A of the line charge of flour and deliver same into residue hopper 33–C. On the next cycle of operation rotary feeder 30–F is operated for a few seconds sufficient to partially or completely deliver the previously collected line charge from residue hopper 33–C to conduit 70–A. Rotary feeder 30–E continues to operate until the desired predetermined weight of flour has been collected in scale hopper 22–B.

It should be pointed out that additional storage bins, such as bin 20–E, can be incorporated in the system of Figure 2 and operated in the manner described above.

If desired the system of Figure 2 can be provided with a diverter 75 at the entrance to the residue hoppers for delivering flour to a dusting flour container 78 as seen in Figure 1. Container 78 can also be connected or indicated by dotted lines as seen in Figure 3.

Figure 3:
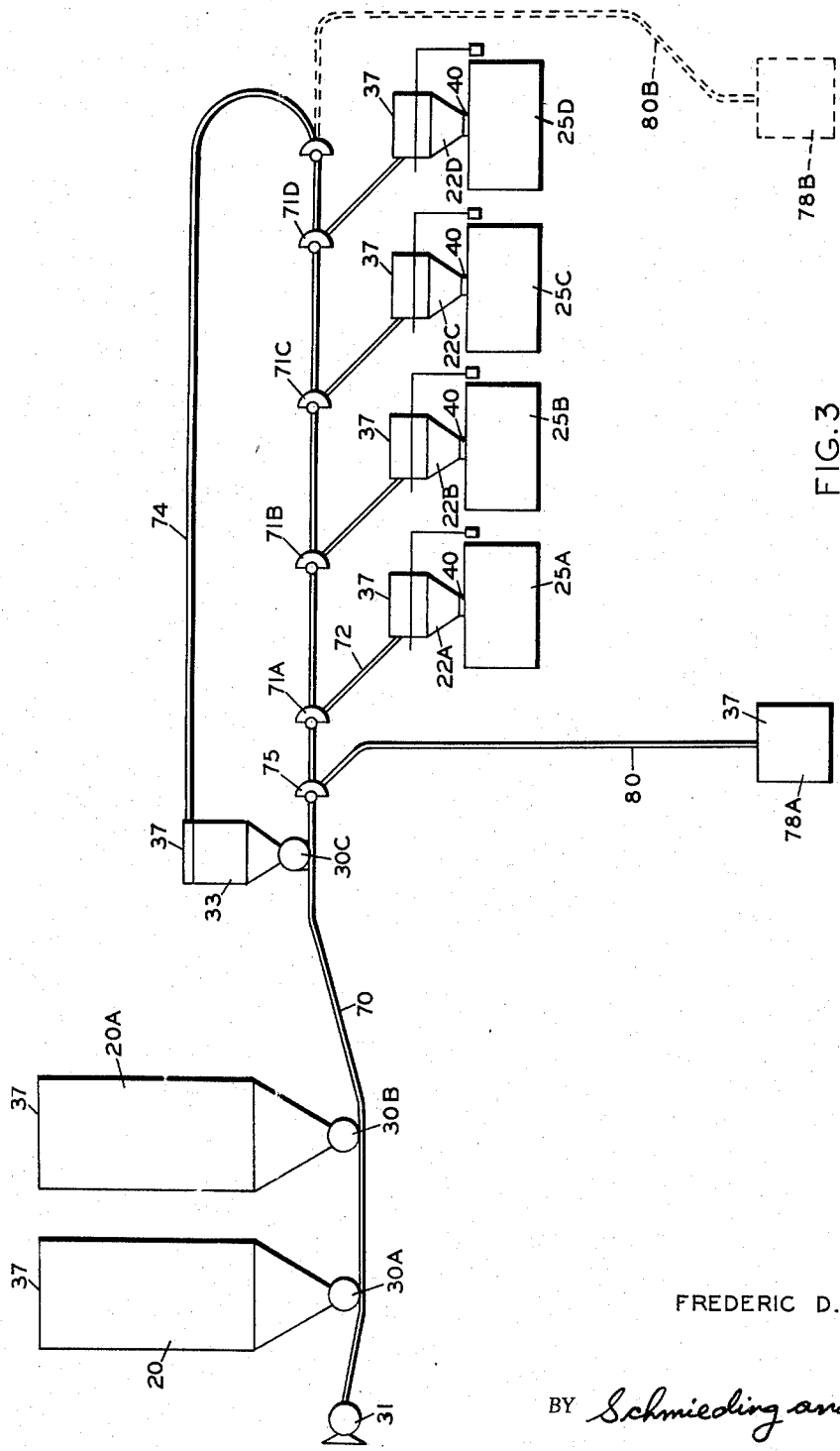
Fig. 3 is a diagrammatic view of a third flour handling system constructed according to the present invention and comprising another aspect thereof.

Reference is next made to Figure 3 which illustrates another flour handling system constructed according to the present invention. This system includes a first storage means 20 and a second storage means 20–A each of which is arranged to deliver flour to a conduit 70 leading to a plurality of diverter valves 71–A through 71–D each of which leads to a respective scale hopper 22–A through 22–D depending on the arrangements of the valves. Assuming flour is being delivered to scale hopper 22–A diverter valve 71–A is set to connect conduit 70 with conduit 72 whereby air from blower 31 picks up flour from rotary feeder 30–A or 30–B, drawing flour from any one or more of multiple storage bins, and delivers the flour to the scale hopper. When a predetermined weight of flour is delivered to scale hopper 22–A diverter valve 71–A is automatically actuated to connect conduit 70 with conduit 74 leading to residue hopper 33.

With continued reference to Figure 3 when the next cycle is started, rotary feeder 30–C is operated for a time sufficient to partially or completely clear same of the previously deposited line charge at which time rotary feeder 30–C is stopped and one of the rotary feeders 30–A or 30–B continues to supply flour from one of the storage bins to line 70 until the predetermined weight of flour required at scale hopper 22–A has been deposited therein. Normally closed valve 40 is next actuated to deliver the weighed charge of flour to mixer 25–A.

If desired, flour can be transferred to a dusting flour container 78–A by actuating diverter valve 75 to connect conduit 70 with conduit 80.

Figure 4:
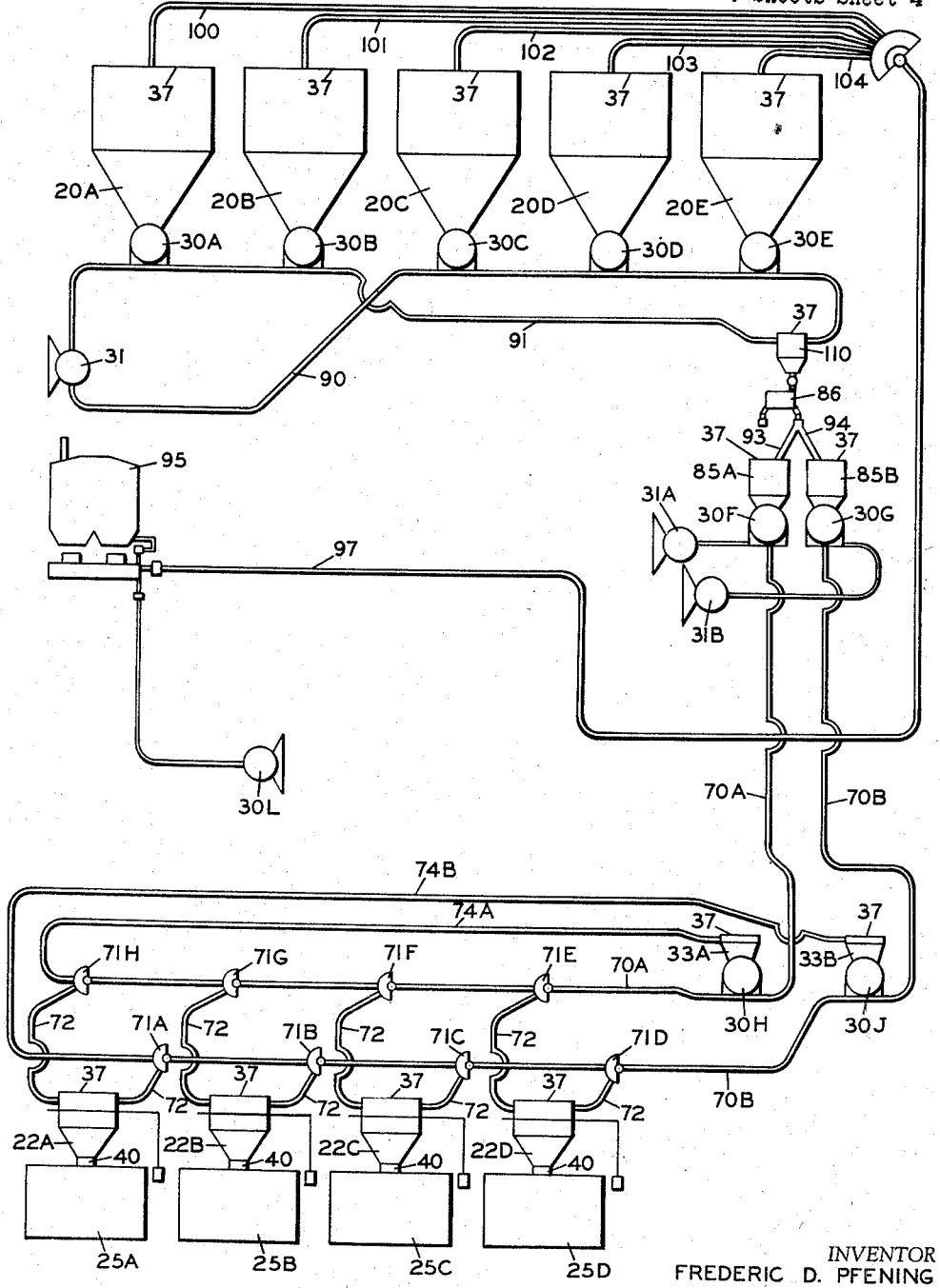
Fig. 4 is a diagrammatic view of a fourth flour handling system constructed according to the present invention and comprising another aspect thereof.

Reference is next made to Figure 4 which illustrates still another flour handling system constructed according to the present invention. This system includes a plurality of flour storage means 20–A through 20–B which are filled from a railroad car 95 via line 97 and one of the lines 100–104. Flour from any selected one of the storage means is delivered via blower 31 and one of the rotary feeders 30–A through 30–E, line 90 or 91, cyclone collector 110, a sifter 86, and one of the conduits 93–94 to one of a plurality of use bins 85–A or 85–B.

Use bins 85–A and 85–B are used to contain two different flour types. One flour type is delivered from use bin 85–A to any selected one of a plurality of scale hoppers 22–A through 22–D via line 70–A, one of the diverter valves 71–H through 71–E and one of the conduits 72. After a predetermined weight of flour has been delivered from use bin 85–A to a scale hopper, such as 22–A, the diverter valve 71–B leading thereto is automatically actuated to connect conduit 70–A to conduit 74–A whereby the line charge of flour in line 70–A is deposited in a residue hopper 33–A.

With continued reference to Figure 4 when the next flour delivery cycle is started, rotary feeder 30–H is operated for a time sufficient to partially or completely clear same of the previously deposited line charge. Rotary feeder 30–H is then stopped and blower 31–A and rotary feeder 30–F continue to operate and supply flour from use bin 85–A until the predetermined weight of flour has been delivered to the selected scale hopper.

If a different type of flour is desired at the mixers 25–A through 25–D such other flour type is delivered from the other use bin 85–B, rotary feeder 30–G, line 70–B, one of the diverter valves 71–A through 71–D, and a line 72 to the selected one of the mixers.

A weighed charge of flour is delivered from a scale hopper to a respective one of the mixers 25–A through 25–D by actuation of a normally closed valve 40.

Reference is next made to Fig. 5 which illustrates still another flour handling system constructed according to the present invention. The system of Fig. 5 differs from that of Fig. 1 in that a receiver 120, including an outlet valve 122, is located between a scale hopper 22–B and a mixer 25. The function of receiver 120 in the system of Fig. 5, is to receive and hold a weighed charge of flour to clear scale hopper 22–B so that it can be used to weigh a subsequent charge of flour before mixer 25 has completed its mixing operation.

It will be understood that in the system of Fig. 5, residue hopper 33–B functions in the same manner as residue hopper 33–B in the system of Fig. 1; that is, after a weighed charge of flour has been delivered from storage bin 20 to scale hopper 22–B valve 71 is actuated to disconnect line 72 and connect line 76 to line 70 whereby the line charge in conduit 70 is delivered to residue hopper 33–B. During the next cycle of operation, the previously deposited line charge is released from hopper 33–B via rotary feeder 30–D to line 70 and thence to scale hopper 22–B.

It will be understood that the system of Fig. 5 can be modified to include a plurality of scale hoppers 22–B and a plurality of mixers 25, in the manner of Fig. 3, except that a plurality of receivers 120 are interposed between the scale hoppers and the mixers.

While the form of embodiments of the present invention as herein disclosed constitute preferred forms, it is to be understood that other forms might be adopted, all coming within the scope of the claims which follow.

I claim:

1. A pneumatic conveying system for handling finely divided particles comprising, in combination, storage means for a supply of said particles; conduit means leading from said storage means; an inlet communicating with said conduit means and a scale hopper for receiving and weighing charges of said particles from said storage means, said scale hopper including an inlet communicating with said conduit means and an outlet; a first valve means for said outlet of said scale hopper; a residue hopper including an inlet communicating with a portion of said conduit means downstream of said inlet of said scale hopper and an outlet communicating with a portion of said conduit means upstream of said inlet of said scale hopper; means for venting air from said residue hopper; a second valve means for said inlet of said scale hopper, said valve means including a normally open position during operation of said pneumatic conveying means whereby said flow of particles and air is delivered to said scale hopper and a closed position wherein said flow is delivered to said residue hopper to deposit the conduit line charge therein; control means for said second valve means for moving said valve means from said normally open position to said closed position responsive to the weighing of a charge at said scale hopper; a mixer under said scale hopper for receiving said charges of particles from said scale hopper; a second scale hopper for receiving and weighing charges of said particles from said storage means, said second scale hopper including an outlet and an inlet, said inlet communicating with said conduit means upstream of said inlet of said residue hopper; a third valve means for said outlet of said second scale hopper; a fourth valve means for said inlet of said second scale hopper, said valve means including a normally open position during operation of said pneumatic conveying means whereby said flow of particles and air is delivered to said second scale hopper and a closed position wherein said flow is delivered to said residue hopper to deposit the conduit line charge therein; a second control means for said fourth valve means for moving said valve means from said normally open position to said closed position responsive to the weighing of a charge at said second scale hopper; a second mixer under said second scale hopper for receiving said charges of particles from said second scale hopper; and means for venting air from said scale hoppers.

2. A pneumatic conveying system for handling finely divided particles comprising, in combination, storage means for a supply of said particles; conduit means leading from said storage means; pneumatic particle conveying means for delivering a flow of particles and air through said conduit means; a mixer; a scale hopper for receiving and weighing charges of said particles from said storage means, said scale hopper including an inlet communicating with said conduit means and an outlet communicating with said mixer; a first valve means for said outlet of said scale hopper; a residue hopper including an inlet communicating with a portion of said conduit means downstream of said inlet of said scale hopper and an outlet communicating with a portion of said conduit means upstream of said inlet of said scale hopper; means for venting air from said residue hopper; a second valve means for said inlet of said scale hopper, said valve means including a first position during operation of said pneumatic conveying means whereby said flow of particles and air is delivered to said scale hopper and a second position wherein said flow is delivered to said residue hopper to deposit the conduit line charge therein; control means for said second valve means for moving said valve means from said first position to said second position responsive to the weighing of a charge at said scale hopper; a rotary feeder at the outlet of said residue hopper for feeding said particles into said conduit means during operation of said pneumatic particle conveying means; and means for venting air from said scale hopper.

3. The apparatus defined in claim 2 wherein said conduit means includes a two-position diverter valve having first and second outlets; a dusting flour container, said first outlet communicating with said residue hopper and said second outlet communicating with said dusting flour container; and means for venting air from said dusting flour container.

4. A pneumatic conveying system for handling finely divided particles comprising, in combination, a first storage means for a supply of said particles; a first conduit means leading from said first storage means; a first pneumatic particle conveying means for delivering a flow of particles and air through said first conduit means; a mixer; a scale hopper for receiving and weighing charges of said particles from said first storage means, said scale hopper including an inlet communicating with said conduit means and an outlet communicating with said mixer; a first residue hopper including an inlet communicating with a portion of said first conduit means downstream of said inlet of said scale hopper and an outlet communicating with a portion of said first conduit means upstream of said inlet of said scale hopper; means for venting air from said first residue hopper; a first valve means for said inlet of said scale hopper, said valve means including a first position during operation of said first pneumatic conveying means whereby said flow of particles and air is delivered to said scale hopper and a second position wherein said flow is delivered to said first residue hopper to deposit the conduit line charge therein; control means for said first valve means for moving said valve means from said first position to said second position responsive to the weighing of a charge at said scale hopper; a rotary feeder at the outlet of said first residue hopper for feeding said residue into said conduit means during operation of said first pneumatic particle conveying means; a second storage means for a supply of said particles; a second conduit means leading from said second storage means; a second pneumatic particle conveying means for delivering a flow of particles and air through said second conduit means; a second residue hopper including an inlet communicating with a portion of said second conduit means downstream of said inlet of said scale hopper and an outlet communicating with a portion of said second conduit means upstream of said inlet of said scale hopper; means for venting air from said second residue hopper; a second valve means for said inlet of said scale hopper, said valve means including a first position during operation of said second pneumatic conveying means whereby said flow of particles and air is delivered to said scale hopper and a second position wherein said flow is delivered to said second residue hopper to deposit the conduit line charge therein; control means for said second valve means for moving said valve means from said first position to said second position responsive to the weighing of a charge at said scale hopper; particle feeding means at the outlet of said second residue hopper for feeding particles into said second conduit means during operation of said second pneumatic particle conveying means; a third valve means for the outlet of said scale hopper; and means for venting air from said scale hopper.

5. The apparatus defined in claim 4 wherein said conduit means includes a two-position diverter valve having first and second outlets; a dusting flour container, said first outlet communicating with said residue hopper and said second outlet communicating with said dusting flour container; and means for venting air from said dusting flour container.

6. A pneumatic conveying system for handling finely divided particles comprising, in combination, storage means for a supply of said particles, conduit means leading from said storage means; pneumatic particle conveying means for delivering a flow of particles and air through said conduit means; a plurality of mixers; a plurality of scale hoppers for receiving and weighing charges of said particles from said storage means, each of said scale hoppers including an inlet communicating with said conduit means and an outlet communicating with one of said mixers; a plurality of first valve means for said outlets of said scale hopper; a residue hopper including an inlet communicating with a portion of said conduit means downstream of said inlet of said scale hopper and an outlet communicating with a portion of said conduit means upstream of said inlet of said scale hoppers; means for venting air from said residue hopper; a plurality of second valve means for said inlets of said scale hoppers, each of said valve means including a first position during operation of said pneumatic conveying means whereby said flow of particles and air is delivered to a scale hopper and a second position wherein said flow is delivered to said residue hopper to deposit the conduit line charge therein; control means for said plurality of second valve means for moving said valve means from said first positions to said second positions responsive to the weighing of a charge at a scale hopper; particle feeding means at the outlet of said residue hopper for feeding said particles into said conduit means during operation of said pneumatic particle conveying means; and means for venting air from said scale hoppers.

7. The apparatus defined in claim 6 wherein said conduit means includes a two-position diverter valve downstream of said residue hopper including first and second outlets; a dusting flour container, said first outlet communicating with said plurality of scale hoppers and said second outlet communicating with said dusting flour container; and means for venting air from said dusting flour container.

8. A pneumatic conveying system for handling finely divided particles comprising, in combination, a first storage means for a supply of said particles, a first conduit means leading from said first storage means; a first pneumatic particle conveying means for delivering a flow of particles and air through said first conduit means; a plurality of mixers; a plurality of scale hoppers for receiving and weighing charges of said particles from said first storage means, each of said scale hoppers including an inlet communicating with said first conduit means and an outlet communicating with one of said mixers; a first residue hopper including an inlet communicating with a portion of said first conduit means leading from said scale hoppers and an outlet communicating with a portion of said first conduit means leading to said scale hoppers; means for venting air from said first residue hopper; a plurality of first valve means for said inlets of said scale hoppers, each of said valve means including a first position during operation of said first pneumatic conveying means whereby said flow of particles and air is delivered to a scale hopper and a second position wherein said flow is delivered to said first residue hopper to deposit the conduit line charge therein; control means for said plurality of first valve means for moving said valve means from said first positions to said second positions responsive to the weighing of a charge at a scale hopper; a second storage means for a supply of said particles, a second conduit means leading from said second storage means; a second pneumatic particle conveying means for delivering a flow of particles and air through said second conduit means to said scale hoppers; a second residue hopper including an inlet communicating with a portion of said second conduit means leading from said scale hoppers and an outlet communicating with a portion of said second conduit means leading to said scale hoppers; means for venting air from said second residue hopper; a plurality of second valve means for said inlets of said scale hoppers, each of said second valve means including a first position during operation of said second pneumatic conveying means whereby said flow of particles and air is delivered to a scale hopper and a second position wherein said flow is delivered to said second residue hopper to deposit the conduit line charge therein; control means for said plurality of second valve means for moving said valve means from said first positions to said second positions responsive to the weighing of a charge at a scale hopper; a plurality of third valve means for the outlets of said scale hoppers; and means for venting air from said scale hoppers.

9. The apparatus defined in claim 8 wherein one of said first and second conduit means includes a two-position diverter valve downstream of said residue hopper including first and second outlets; a dusting flour container, said first outlet communicating with said plurality of scale hoppers and said second outlet communicating with said dusting flour container; and means for venting air from said dusting flour container.

10. A pneumatic conveying system for handling finely divided particles from a container to a remote destination, including a container from which finely divided particles may be drawn; a weighing scale hopper at a remote destination to which finely divided particles may be delivered, said scale hopper having a movable element which moves from its normal position when the hopper has received a predetermined weight of finely divided particles; a residue hopper including an inlet and an outlet; a main conveying conduit extended from its inlet end at the container past the scale hopper in close proximity thereto and communicating at its discharge end with said inlet of said residue hopper; said residue hopper including an inlet and an outlet; means including a diverter valve in the main conduit operative in its diverting position to divert finely divided particles from the main conduit into the scale hopper and in its straight-through position to block communication between the main conduit and the scale hopper and permit flow through the main conduit to said residue hopper; means for blowing air through the main conduit; means for feeding finely divided particles from the container into the main conduit at its inlet end for delivery by the air flowing throughout into the scale hopper when said valve is in diverting position; means operable in response to movement of said element from its normal position while finely divided particles are being conveyed through said main conduit to shift said valve to its straight-through position in order to terminate delivery of finely divided particles to said scale hopper; means actuated in response to movement of said diverter valve to its straight-through position for stopping the feed of finely divided particles to the main conduit in order to permit the air blowing means to clear the main conduit by returning the finely divided particles therein to said residue hopper after the diverter valve is returned to its straight-through position; and means for venting air from said scale hopper.

11. A pneumatic conveying system for handling finely divided particles comprising, in combination, a storage means for a supply of said particles; conduit means leading from said storage means; a mixer; a receiver including an inlet and an outlet communicating with said mixer; pneumatic particle conveying means for delivering a flow of particles and air through said conduit means; a scale hopper for receiving and weighing charges of said particles from said storage means, said scale hopper including an inlet communicating with said conduit means and an outlet communicating with said inlet of said receiver; a first valve means for said outlet of said scale hopper; a residue hopper including an inlet communicating with a portion of said conduit means downstream of said inlet of said scale hopper and an outlet communicating with a portion of said conduit means upstream of said inlet of said scale hopper; means for venting air from said residue hopper; a second valve means for said inlet of said scale hopper, said valve means including a first position during operation of said pneumatic conveying means whereby said flow of particles and air is delivered to said scale hopper and a second position wherein said flow is delivered to said residue hopper to deposit the conduit line charge therein; control means for said second valve means for moving said valve means from said first position to said second position responsive to the weighing of a charge at said scale hopper; a rotary feeder at the outlet of said residue hopper for feeding said residue into said conduit means during operation of said pneumatic particle conveying means; a third valve means for the outlet of said receiver; and means for venting air from said scale hopper.

References Cited in the file of this patent

UNITED STATES PATENTS

| | | |
|---|---|---|
| 2,572,862 | Israel | Oct. 30, 1951 |
| 2,581,853 | Glaza | Jan. 8, 1952 |
| 2,688,517 | Riordan | Sept. 7, 1954 |
| 2,688,518 | Krenke | Sept. 7, 1954 |
| 2,795,463 | Weller | June 11, 1957 |
| 2,810,609 | Temple | Oct. 27, 1957 |